United States Patent [19]

Clark

[11] Patent Number: 5,246,650
[45] Date of Patent: Sep. 21, 1993

[54] METHOD OF APPLYING AGGREGATE SURFACE FINISH

[76] Inventor: Richard C. Clark, 74-425 Goleta Ave., Palm Desert, Calif. 92260

[21] Appl. No.: 709,484

[22] Filed: Jun. 3, 1991

[51] Int. Cl.$^5$ .................. B29C 71/00; E04B 1/16
[52] U.S. Cl. ......................... 264/87; 264/35; 264/101; 264/233; 264/259; 264/310; 264/333; 264/341; 264/344; 425/85
[58] Field of Search ............ 264/101, 87, 33, 34, 264/35, 333, 341, 344, 233, 232, 259, 310; 425/85

[56] References Cited

U.S. PATENT DOCUMENTS

| | | |
|---|---|---|
| 1,066,201 | 7/1913 | Fulper . |
| 1,601,774 | 10/1926 | Scheffer . |
| 2,046,867 | 7/1936 | Billner .................. 264/87 X |
| 2,524,419 | 10/1950 | Billner .................. 264/87 X |
| 2,529,500 | 11/1950 | Johnson ............... 425/85 X |
| 2,533,263 | 12/1950 | Johnson ............... 425/85 X |
| 2,631,326 | 3/1953 | Smith, Jr. . |
| 2,751,618 | 6/1956 | Pruitt . |
| 3,135,986 | 6/1964 | Tolin . |
| 3,147,509 | 9/1964 | Sieb . |
| 3,506,747 | 4/1970 | Creskoff ............... 264/101 X |
| 3,600,771 | 8/1971 | Dyrander ............... 425/85 |
| 4,170,805 | 10/1979 | Kumagai . |
| 4,198,472 | 4/1980 | Brown . |
| 4,266,581 | 5/1981 | Wenander . |
| 4,335,065 | 6/1982 | Ando ............... 264/333 X |
| 4,386,873 | 1/1983 | Messner et al. . |
| 4,399,585 | 8/1983 | Kullik et al. . |
| 4,447,931 | 5/1984 | Lindqvist . |
| 4,476,607 | 10/1984 | Ross . |
| 4,496,504 | 1/1985 | Steenson et al. ............ 264/333 X |
| 4,748,788 | 6/1988 | Shaw et al. ............ 264/333 X |
| 4,803,034 | 2/1989 | Moret ............... 264/138 X |
| 4,887,330 | 12/1989 | Woodhall et al. . |
| 5,104,594 | 4/1992 | Hillemeier et al. ............ 264/345 X |

FOREIGN PATENT DOCUMENTS

| | | |
|---|---|---|
| 500268 | 5/1979 | Australia . |
| 1135572 | 11/1982 | Canada . |
| 94320 | 8/1978 | Japan ............... 264/87 |
| 7605872 | 12/1976 | Netherlands ............... 264/87 |

OTHER PUBLICATIONS

1989 Pebble Tec Brochure.

*Primary Examiner*—Karen Aftergut
*Attorney, Agent, or Firm*—Knobbe, Martens, Olson & Bear

[57] ABSTRACT

A roller vacuum apparatus removes cement slurry from a freshly laid exposed aggregate surface. In one embodiment, the exposed aggregate surface is applied to a cement substrate which is worked to compact the aggregate and draw the portland cement in the mixture to the surface of the coating. Subsequently, the surface coating is washed to remove excess portland cement. The roller vacuum removes the cement slurry without disturbing the freshly laid exposed aggregate surface by wicking the slurry into a transfer medium of the vacuum roller. A vacuum is applied to the transfer medium to remove the cement slurry from the roller.

14 Claims, 5 Drawing Sheets

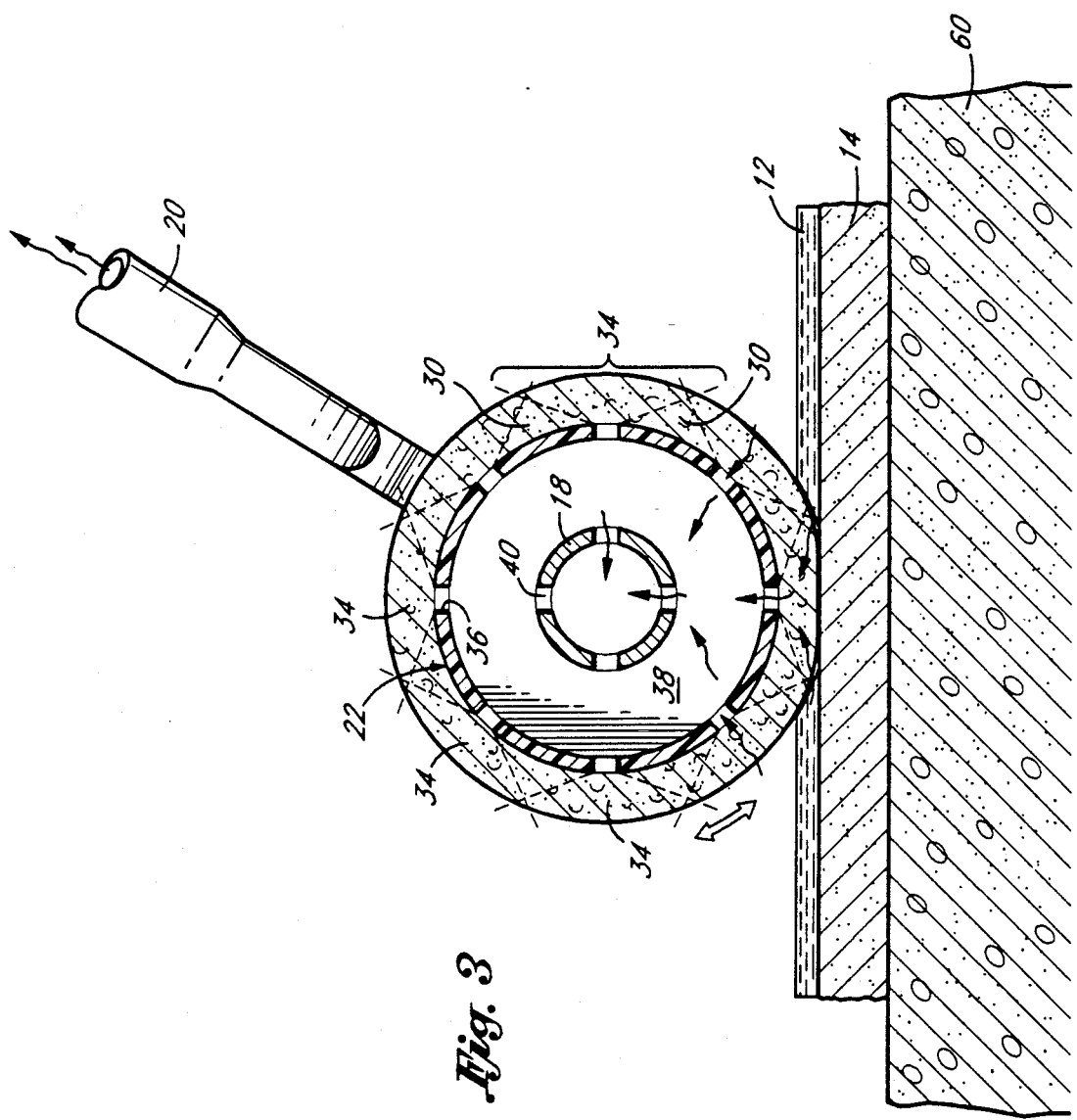

METHOD OF APPLYING AGGREGATE SURFACE FINISH

BACKGROUND OF THE INVENTION

1. Field of the Invention

The present invention generally relates to an apparatus for and a method of applying a surface treatment or coating on a large area masonry work, and more particularly to an apparatus for and method of applying an "exposed aggregate" surface.

2. Description of the Related Art

Commonly, skilled tradesmen finish concrete structures, such as, for example, paths, deckings, water features and swimming pools, with an exposed aggregate surface. The exposed aggregate surface typically comprises relatively small pebbles (i.e., aggregate) of a selected size bound together by a suitable cement binder.

Several different processes may be used to finish concrete structures with an exposed aggregate coating. One method involves application of a layer of epoxy adhesive cement to a cured concrete substrate and troweling the aggregate into the cement. Another method employs a seeding technique to apply a thin layer of aggregate to a concrete surface prior the cement hardening The seeded aggregate is worked into the cement to partially embed the aggregate. These processes, however, are labor intensive and require using skilled tradesmen Consequently, these methods are expensive and a small team of workers can only complete a small job in one day.

Other methods employ a washing step to remove excess cement. For example, one such method involves application of a portland cement and aggregate mixture to a cement substrate. The excess cement is washed away leaving the aggregate partially exposed A portland cement and aggregate mixture may also be sprayed onto a concrete substrate After spraying, localized pressure is applied over the surface of the mixture to pack the aggregate particles into the layer, and the excess portland cement is washed away. This method is disclosed in U.S. Pat. No. 4,198,472 issued to Brown, which is hereby incorporated by reference. The latter methods, however, have disadvantages when used on generally horizontal surfaces having a grade less than ten (10) percent. On horizontal surfaces, it is difficult to completely remove the cement slurry from the exposed aggregate layer Further, when applying an exposed aggregate coating to a structure such as a swimming pool, the water wash tends to puddle on the exposed aggregate surface at the bottom of the pool and must be removed by rags or absorbent rollers, such as paint rollers.

SUMMARY OF THE INVENTION

The present invention defines an apparatus for removing slurry from a freshly laid masonry surface by a vacuum. The apparatus comprises a vacuum conduit and a roller comprising a transfer medium and a tubular body supporting the transfer medium The transfer medium has an absorbency sufficient to wick the slurry from the masonry surface into the transfer medium, and the tubular body has a plurality of suction apertures disposed about the circumference of the tubular body. The roller couples to the vacuum conduit to provide a vacuum within the tubular body around the circumference to draw the slurry from the transfer medium into the tubular body through the apertures. The transfer medium comprises a sufficiently porous material to disperse the vacuum at each suction aperture to form vacuum dispersion areas within the transfer medium Preferably, the suction apertures are sufficiently sized and closely spaced to distribute the vacuum so as to substantially uniformly dry the transfer medium The sizing and spacing of the suction apertures are such to produce juxtaposed vacuum dispersion areas. It is further preferred that the vacuum dispersion areas overlap both longitudinally and circumferentially so as to cover substantially the entire outer surface of the transfer medium.

Preferably, the tubular body has an aggregate suction aperture area to exterior surface area ratio $\tau$ ranging between 0.05 and 0.25. It is further preferred that the ratio $\tau$ approximately equals 0.17. It is also preferred that the suction apertures have a circular configuration, and that a vacuum continuously acts on the transfer medium at each suction aperture as the roller rotates.

The apparatus additionally comprises an axle rotatably coupled to the roller to allow the transfer medium to roll over the masonry surface. In the preferred embodiment, the axle comprises an axle conduit having a plurality of apertures and connected to the vacuum conduit. A plurality of bearing seals supports the roller on the axle conduit and seals the interior of the tubular body from ambient air The assembled vacuum roller apparatus is sufficiently light to prevent displacing or marring the freshly laid masonry surface as the roller vacuum apparatus travels across the surface.

In the preferred embodiment, the apparatus is adapted to draw slurry from an exposed aggregate surface. The suction apertures have a diameter approximately equal to 0.25 inch, and are arranged in a series of 1-inch square quincrux arrangements generally covering the entire exterior surface of the tubular body to produce a ratio $\tau$ approximately equal to 0.17. The transfer medium preferably comprises a polyurethane foam having a thickness approximately equal to 0.38 inch. In use, the vacuum inside the tubular body interior is approximately equal to about 5 pounds.

In accordance with another aspect of the invention, a method is defined for removing slurry form a freshly laid compacted masonry surface The method comprises the steps of applying a transfer medium to the slurry covering the freshly laid compacted surface and wicking the slurry into the transfer medium without disturbing the surface of the compacted masonry. The method further comprises removing the slurry from the transfer medium by a vacuum. Preferably, the vacuum removes the slurry from the transfer medium without applying a significant vacuum at the exterior surface of the transfer medium in contact with the masonry surface. The removing step comprises the step of dispersing the vacuum in the transfer medium to produce vacuum dispersion areas in the transfer medium to uniformly dry the transfer medium. The vacuum dispersion areas preferably overlap.

Desirably, the transfer medium is applied to the slurry by rolling the transfer medium across the masonry surface. The vacuum removes the slurry from the transfer medium through suction apertures disposed in a tubular body supporting the transfer medium The vacuum produces vacuum dispersion areas about each suction aperture, distributing the vacuum substantially throughout the transfer medium to uniformly dry the transfer medium.

In accordance with a further aspect of the present invention, a method is defined for applying an exposed aggregate surface coating to a substrate. The method includes the step of mixing a composite of cement and aggregate, the aggregate consisting essentially of pebbles having a substantially uniform size ranging between 0.125 and 0.50 inch. The composite is mixed in a volume ratio of more than 1 part cement to 4 parts aggregate. Water is added to the composite to provide a slump between 2 and 10 inches, and composite is deposited onto the substrate. Subsequently, pressure is applied over the surface of the deposited composite to form a compacted layer and to draw the cement to the surface of the layer. By applying a fine water spray onto the compacted layer, the cement is loosened from the surface of the compacted layer and forms a slurry of water and cement. The method additionally includes the step of applying a transfer medium to the slurry and wicking the slurry into the transfer medium without significantly disturbing the compacted layer. Finally, the slurry is removed from the transfer medium by a vacuum.

Preferably, an add mix is added to the composite to alter the mix design of the composite. Subsequently, the composite is preferably deposited on the substrate by pumping the composite through a cement pump.

BRIEF DESCRIPTION OF THE DRAWINGS

These and other features of the invention will now be described with reference to drawings of a preferred embodiment which is intended to illustrate, and not to limit, the invention, and in which:

FIG. 3 is a cross-sectional view taken along line 3—3 of FIG. 1;

DESCRIPTION OF THE PREFERRED EMBODIMENTS

Figure 1:
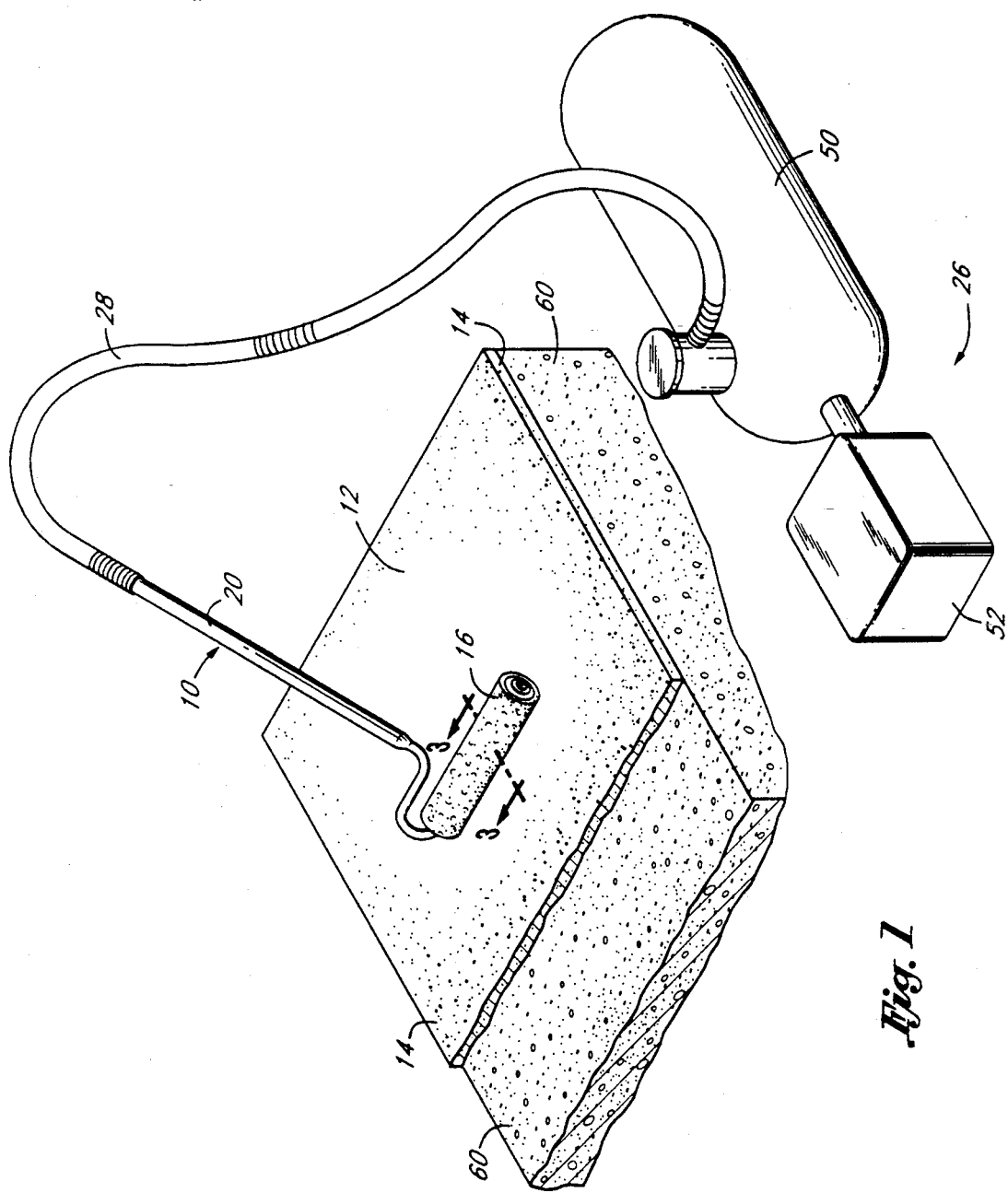
FIG. 1 is a schematic perspective view illustrating a roller vacuum apparatus in accordance with an embodiment of the present invention coupled to a vacuum source and used in connection with a masonry work.

FIG. 1 illustrates a preferred embodiment of a roller vacuum apparatus 10 which draws a cement slurry 12 (i.e., a mixture including cement and water) from a freshly laid masonry surface 14. As used herein, "masonry surface" and "masonry work" include a variety of concrete products using rock, cement and/or sand. Preferably, the roller vacuum 10 draws the slurry 12 from the masonry surface 14 without marring or disturbing the masonry surface 14. Moreover, the roller vacuum 10 swiftly finishes a masonry work, decreasing the time involved to complete a large area job, such as, for example, a ten foot by ten foot section, or larger.

As a result, larger area masonry works can be completed more quickly with less labor The roller vacuum 10 is particularly advantageous for use in connection with application of aggregate mixtures of the type disclosed in U.S. Pat. No. 4,198,472, to a generally horizontal surface, i.e., a surface having less than a ten (10) percent grade.

Roller Vacuum Apparatus

Figure 2:
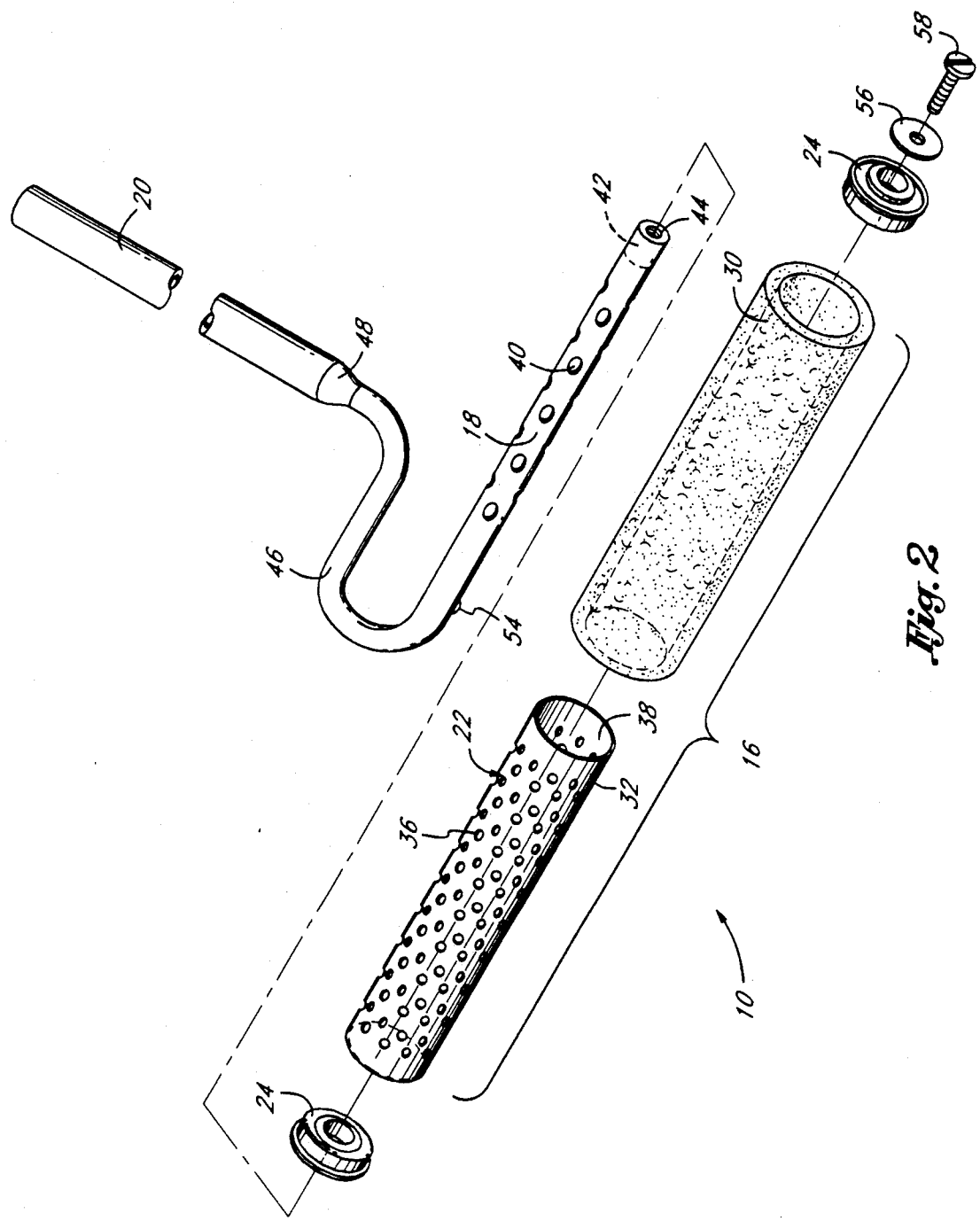
FIG. 2 is an exploded perspective view of the roller vacuum of FIG. 1.

Referring to FIGS. 1 and 2, the roller vacuum 10 includes a roller 16, an axle conduit 18, and a handle 20. The roller 16 has a tubular body 22, which is inserted onto the axle conduit 18. A pair of bearing seals 24 supports the roller 16 on the axle conduit 18 A distal end of the handle 20 connects to the axle conduit 18, and a proximal end of the handle 20 connects to a vacuum source 26 via a vacuum conduit 28. As used herein, "proximal" and "distal" refer to the proximity of the vacuum source 26. The individual components of the roller vacuum 10 will now be described in detail.

As illustrated in FIG. 2, the roller 16 comprises a transfer medium 30 attached to the tubular body 22. Preferably, the transfer medium 30 completely covers the entire exterior surface 32 of the tubular body 22. The tubular body 22 is preferably fabricated of a polymer, and more preferably poly-vinyl-chloride (PVC), class 120.

The transfer medium 30 comprises a material having an absorbency sufficient to wick the fluid cement slurry 12 into the transfer medium 30. Such wicking by the transfer medium 30 is due to capillary action produced by the pressure differential across the liquid-ambient air interface in the pores of the transfer medium 30. The capillary action causes the slurry 12 to be drawn into the transfer medium 30 without application of a vacuum thereto Preferably, the transfer medium 30 comprises an elastic porous membrane having wicking action sufficient to cause fluid migration from the outer surface of the transfer medium 30, through the transfer medium, and to the outer surface of the tubular body 22. In the preferred embodiment, the transfer medium 30 comprises an open-cell polyurethane foam.

The transfer medium 30 has a thickness, i.e., a dimension in the radial direction from a longitudinal axis of the tubular body 22, between 0.06 inch and 2.00 inches Preferably, the transfer medium thickness 30 ranges between 0.25 and 0.75 inch, and in the preferred embodiment equals approximately 0.38 inch Referring to FIG. 2, the tubular body 22 includes a plurality of suction apertures 36 opening into an interior 38 of the tubular body 22. Although FIG. 2 illustrates the suction apertures 36 as comprising circular holes, it is understood that other aperture configurations can be used as well. For example, the suction apertures 36 may comprise oval shaped slots or elongated grooves extending along a portion of the tubular body longitudinal length, around a portion of the tubular body circumference, or along the tubular body in a helical fashion Preferably, however, the suction apertures 36 comprise circular holes having diameters ranging between 0.06 inch to 1.00 inch In the preferred embodiment, the apertures 36 equal about 0.25 inch Irrespective of the aperture configuration, the suction apertures 36 are preferably sufficiently sized and closely spaced to uniformly dry the transfer medium 30 when a vacuum force is applied at the apertures 36.

Figure 4A:
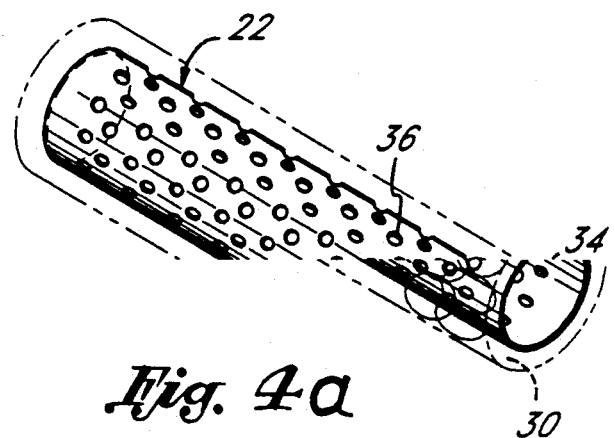
FIG. 4a is a perspective view of a tubular body shown in FIG. 2 schematically illustrating a series of dispersion areas.

In use, the roller 16 travels over the masonry work 14 absorbing cement slurry 12, as schematically illustrated in FIG. 3. The vacuum source 26 applies a vacuum within the tubular body 22 around the circumference and along the length of its interior walls 38. The vacuum applies to all of the surface apertures simultaneously, and acts on the transfer medium 30 through the suction apertures 36 to draw the slurry 12 from the transfer medium 30 through the suction apertures 36. Because of the porous nature of the transfer medium 30, the vacuum disperses towards the outer surface of the transfer medium 30, acting on a larger area than the suction aperture area. Consequently, the vacuum applied at each suction aperture 26 draws the cement slurry 12 from a larger transfer medium area than the size of the suction aperture, so as to produce vacuum dispersion areas 34 in the transfer medium 30, as schematically illustrated in FIG. 3. The suction apertures 36 are preferably sufficiently large and closely spaced so that the dispersion areas 34 completely cover the transfer medium circumference, and more preferably produce overlapping dispersion areas 34, as schematically illustrated in FIG. 4a. As a result, the transfer medium 30 is uniformly dried by the application of vacuum pressure.

Preferably, the tubular body 22 has a suction to surface area ratio $\Gamma$ ranging between 0.05 and 0.25, and more preferably equals approximately 0.17. The ratio $\Gamma$ is the ratio of the aggregate suction aperture areas to the total exterior surface area of the tubular body 22

Figure 4B:
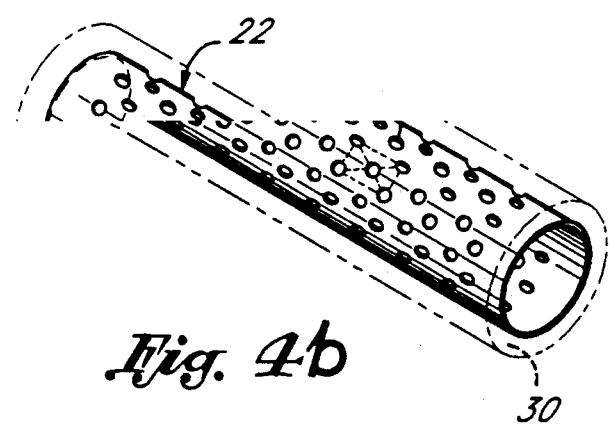
FIG. 4b is a perspective view of the tubular body of FIG. 4a schematically illustrating a hole pattern of the tubular body.

In a preferred embodiment, the suction apertures 36 are positioned around the circumference of the tubular body 22 in one square inch quincrux arrangements, as schematically shown in FIG. 4b. A set of five holes, each 0.25 inch in diameter, is arranged with four holes at the corners of a one inch square and with one hole at the center of the square. Where the tubular body 22 has an exterior diameter generally equal to 1.50 inches, the tubular body 22 includes alternating circumferential rows of nine (9) holes and eight (8) holes, each row off-set from the adjacent row(s) by 0.50 inch measured around the tubular body circumference and spaced apart by 0.50 inch in the longitudinal direction. This sizing and spacing of the suction apertures 36 produces overlapping dispersion areas 34.

Referring to FIG. 2, the axle conduit 18 includes an elongated tubular member having at least one transfer aperture 40 extending from an exterior surface into an interior of the axle conduit 18. Preferably, the axle conduit 18 includes a sufficient number of transfer apertures 40 to maintain a constant vacuum within the interior 38 of the roller tubular body 22 More preferably, the axle conduit 18 includes approximately twenty (20), 0.25 inch holes 40 disposed an equal distance from one another along the length of and around the circumference of the axle conduit 18, as illustrated in FIG. 2. The axle conduit 18 has an exterior diameter smaller than the inner diameter of the roller tubular body 22. A plug 42 seals a distal end of the axle conduit 18 and includes a tapped hole 44 to facilitate coupling of the roller 16 with the axle conduit 18.

A proximal end of the axle conduit 18 couples with the handle 20. Preferably, the axle conduit 18 and the handle 20 integrally connect by a serpentine section of conduit 46. In the integrated assembly, the handle 20 is generally perpendicular to the axle conduit 18, as illustrated in FIG. 2. The handle 20 preferably comprises a hollow tube having an inner diameter larger than the inner diameter of the axle conduit 18. The handle 20 includes a neck 48 in which the handle inner diameter decreases to a size generally equalling the axle conduit inner diameter. The neck 48 is preferably positioned on the proximal side of the serpentine section 46. As stated above, the proximal end of the handle 20 couples to the vacuum source 26 via a flexible vacuum conduit 28.

The vacuum source 26, as schematically illustrated in FIG. 1, comprises a sump tank 50 connected to a vacuum pump 52. The cement slurry 12 drawn from the roller 16 deposits in the sump tank 50. If the cement slurry 12 is likely to setup before dumping the slurry out of the tank 50, for example where weather conditions cause the cement to harden too quickly, a retardant is placed in the tank 50, as known in the art.

Preferably, the vacuum pump 52 applies a vacuum sufficient to draw the cement slurry 12 from the transfer medium 30 without applying a significant vacuum at the exterior surface of the transfer medium 30. In this manner, the roller does not mar the surface of masonry work 14. In addition, when the roller vacuum 10 is used on a freshly laid aggregate surface 14, the vacuum will not significantly displace the aggregate Preferably, the vacuum pump 52 applies a vacuum force of three (3) to five (5) pounds at the roller tubular body interior 38, and in the preferred embodiment, the vacuum force is approximately five (5) pounds.

In assembly, the bearing seals 24 support the roller 16 on the axle conduit 18. Preferably, the bearing seals 24 comprise sealed ball bearings, such as those commercially available from Nice Bearings, Inc. (e.g., Serial No. SKF 5881), having an outer diameter press-fitting into the roller tubular body interior 38 and an inner diameter slip-fitting over the axle conduit 18. The bearing seals 24 substantially seal the interior 38 of the roller tubular body 22 from the ambient air such that a vacuum is created within the tubular body interior 38.

The roller 16 rotatably couples to the axle conduit 18 via the bearing seals 24. The roller 16 slides over the axle conduit 18, with the axle conduit 18 inserting through the inner diameter of bearing seals 24. The roller 16 secures onto the axle conduit 18 between a stop 54 on the proximal side and a washer 56 on the distal side. The washer 56 positions between the distal end of the axle conduit 18 and a screw 58 inserted into the tapped hole 44.

Advantageously, the roller vacuum 10, assembled accordingly, has a sufficiently light weight to prevent the roller 16 from depressing or marring the surface of the masonry work. The roller 16 lightly sits on top of the compacted aggregate layer 14, absorbing the layer of cement slurry 12. It is contemplated that the weight constraint on the roller varies depending upon the amount of time that the aggregate layer has been given to setup prior to removing the slurry The longer the setup time, the more weight the aggregate layer can support. With a longer setup time, however, the cement slurry becomes more difficult to remove. Consequently, it is preferred that the roller vacuum be sufficiently light weight for use on a freshly laid aggregate surface.

Aggregate Application Process

FIG. 1 illustrates in perspective a typical cross-section of a masonry work including a layer of exposed aggregate 14. The layer of exposed aggregate 14 covers a reinforced concrete substrate 60 or the like. Skilled tradesmen lay the reinforced concrete substrate 60 by processes known in the art, prior to applying the exposed aggregate treatment 14. Typically, the exposed aggregate layer 14 ranges in thickness between 0.13 and 0.50 inch, and preferably equals approximately 0.25 inch.

Figure 5:
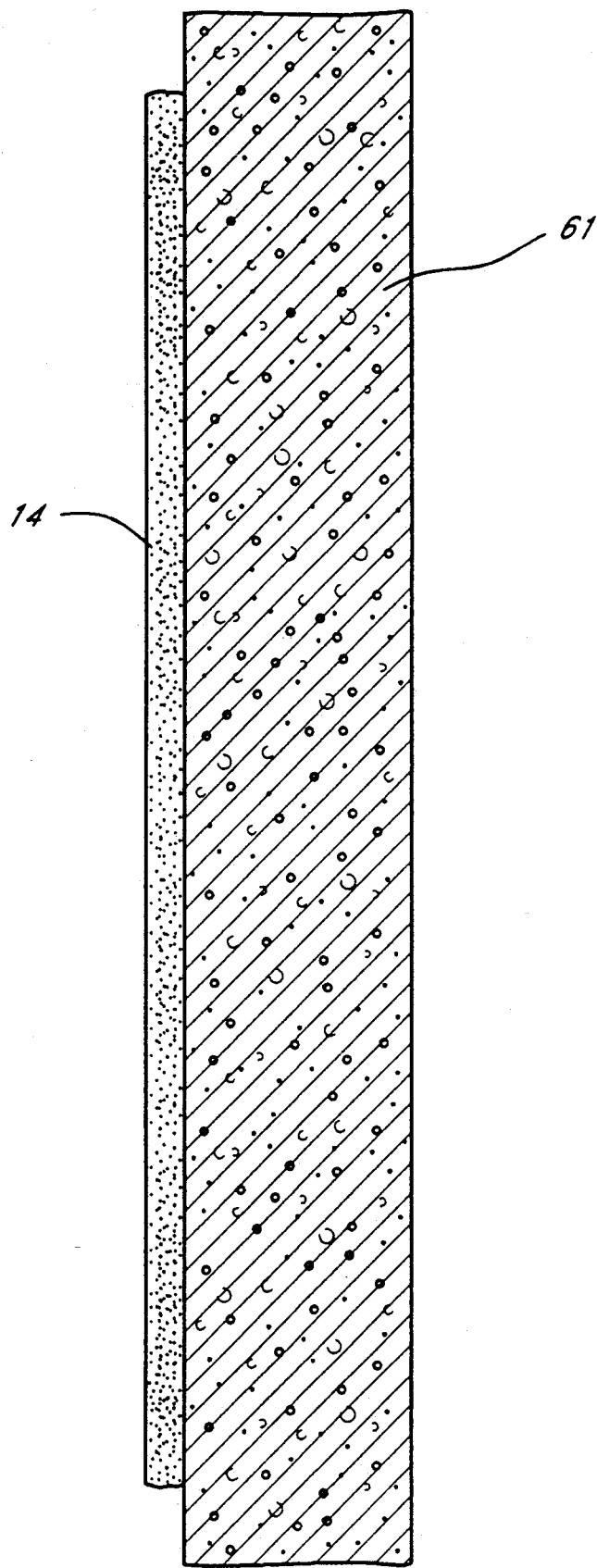
FIG. 5 is a cross-sectional view of a pre-fabricated wall having an exposed aggregate surface coating.

Although FIG. 1 illustrates the aggregate surface 14 covering a cement substrate 60, it is understood that the aggregate surface 14 may cover other types of substrates, such as, for example, a pre-fabricated wall 61 comprising a fire-resistant material such as, for example, a polymer foam or a 1-3 pound polyurethane foam, as illustrated in FIG. 5. It is contemplated that the method of application of the exposed aggregate coating to a variety of substrates types, including cement and polymer foam, is substantially identical, and the discussion herein related to the application of exposed aggregate on a concrete substrate will be understood as applying equally to applications on different substrate materials, unless specified to the contrary.

The exposed aggregate layer 14 comprises a mixture of portland cement and aggregate substantially free of fines The aggregate range in size between 0.125 and 0.50 inch, and preferably the aggregates comprise river washed, rounded pebbles, having a generally uniform size of approximately 0.125 inch. In some applications, the aggregate may further be of a selected color.

Prior to application, the aggregate mixture has a cement to aggregate ratio greater than 1 to 4, and preferably generally equal to 1 to 1. The mixture has a sufficient quantity of water to produce a slump ranging between two (2) and ten (10) inches, and preferably between four (4) and eight (8) inches. As used herein, "slump" represents the subsidence of mass below an original form shape of a frustum of a 12 inch cone, as used in a standard slump test. The desired slump of the mixture, however, depends upon the desired mix design for a specific application of the mixture. For example, a mixture having a fly ash add mix added to improve the strength of the aggregate layer will differ in slump compared to a mixture having a calcium stearate add mix to retard the cement from setting-up. Consequently, the specific slump of the mixture depends on the added add mixes.

Having properly mixed the aggregate mixture, the tradesmen apply the mixture onto the concrete substrate 60, uniformly covering at least a section of the concrete substrate 60. A cement pump may be employed to apply quickly and accurately the desired coating layer 14 or, on horizontal surfaces may be deposited by conventional means, such as wheel-borrows, and evenly spread over the concrete substrate 60. For application on a generally vertical surface, such as a side of a swimming pool, a pump may be used to spray the mixture onto the cement substrate 60, as taught in U.S. Pat. No. 4,198,472. Specific mixture parameters, i.e., the cement to aggregate ratio, slump and aggregate size, which may be utilized in the spraying of the mixture, are disclosed by the '472 patent.

Using a trowel, a fresno or a like cement tool, the tradesmen apply localized pressure progressively over the surface of the aggregate mixture layer 14, compacting the aggregate pebbles together and drawing the cement slurry 14 to the surface of the mixture. The tradesmen, especially when applying the aggregate coating to a pre-fabricated wall, may use a vibrator screen (not shown) to aid or implement compacting the aggregate.

After compacting the aggregate, the tradesmen use a fine water spray to loosen the excess portland cement from the aggregate surfaces The workers subsequently use the roller vacuum 10 to remove the slurry 12 of wash water and excess cement from the aggregate surface 14. In a series of passes, the roller vacuum 10 draws off the cement slurry 12.

The roller vacuum removes the cement slurry 12 without significantly disturbing the aggregate layer 14. Specifically, the roller vacuum 10 does not apply a significant vacuum to the aggregate surface 14. Instead, the transfer medium 30 wicks the cement slurry 12 into the transfer medium 30 by capillary action, which does not affect the aggregate. The vacuum applied to the transfer medium 30 at each suction aperture 36 draws the slurry 12 from the transfer medium 30, as schematically illustrated in FIG. 3.

Preferably, the roller vacuum 10 travels across the masonry surface 14 at a rate which allows the portions of the transfer medium 30 not in contact with the slurry 12 to substantially dry before rotating into contact with the slurry 12 again. The rate of travel should be slow enough to draw the slurry without pushing the mixture around. Using a roller vacuum 10 with a ratio $\tau$ approximately equal to 0.17, a transfer medium thickness approximately equal to 0.38 inch, and a vacuum approximately equal to 5 pounds, the rate of travel should be no greater than six (6) inches per second, and preferably about one (1) inch per second. At the preferred travel rate, the portions of the roller out of contact with the slurry substantially dry before renewing contact with the cement slurry.

Importantly, the vacuum applies a constant, continuous suction force to the transfer medium 30 through all of the apertures 36 during the rotational travel of the roller 16. This permits an increased rate of travel of the roller 16 without sacrificing the wicking efficiency of the transfer medium 30, i.e., the continued absorbency of the transfer medium 30. Moreover, less vacuum force is required because the vacuum dries (i.e., removes slurry from) the transfer medium throughout the entire rotation of the roller.

After initially removing the cement slurry 12 with the roller vacuum 10, the tradesman can rework the aggregate surface 14 by compacting, washing and vacuuming the surface again. Depending upon the desired finish, the aggregate surface 14 may be reworked typically one or two more times after the initial application using the series of steps recited above. The aggregate surface 14 becomes more compact each time the tradesmen rework the surface. After surface hardening, the tradesmen wash the aggregate surface with a dilute hydrochloric acid to brighten the exposed stones, as known in the art.

Advantageously, the roller vacuum 10 not only removes the cement slurry 12 resulting from the water wash, it also finishes the aggregate surface 14. Water washing typically loosens the aggregate requiring a subsequent step of recompacting the aggregate. Moreover, conventionally a heavy water wash is required to loosen the excess portland cement. With the roller vacuum 10, however, a lighter water spray may be used because the roller vacuum 10 is more effective in removing the excess cement than a water spray alone. Additionally, the roller vacuum 10 tends to compact any loosened aggregate as it travels across the aggregate surface removing the water wash slurry 12. Thus, the tradesmen do not have to re-trowel the aggregate surface 14 after water washing.

The finished aggregate layer 14 bonds together by a limited amount of portland cement, or other suitable binder. The aggregate layer 14 provides a durable, waterproof, permanent and attractive coating on a substrate 60. Moreover, the surface retards fire and resists stains and discolorations. Finally, the aggregate layer 14 consists of natural materials available in the majority of countries.

Modifications and variations of the embodiments described above may be made by those skilled in the art while remaining within the true scope and spirit of this invention. For example, the vacuum source may couple directly to the roller tubular body interior independent from the handle or the axle conduit. Further, the length of the roller may be selected depending upon the size of the masonry work and the amount of vacuum pulled by the vacuum pump employed. Additional variations may be apparent to those skilled in the art.

Although the preferred use for the roller vacuum is in connection with the application of an exposed aggregate coating, it is contemplated that the roller vacuum may be used as well on other types of masonry works, such as, for example, concrete slabs or the like. Moreover, those skilled in the art will appreciate that the roller can easily be adapted for other uses, including, but not limited to, cleaning up toxic spills or removing slurry from a roof prior to re-roofing. Accordingly, the scope of the invention is intended to be limited only by the claims which follows.

What is claimed is:

1. A method of removing slurry from a freshly laid compacted masonry surface, comprising the steps of:
    applying a tubular transfer medium to said slurry covering said freshly laid compacted masonry surface, said transfer medium contacting said masonry surface over an area of contact on an exterior surface of said transfer medium;
    rolling said exterior surface of said transfer medium on said slurry without disturbing said masonry surface;
    wicking said slurry into said transfer medium without disturbing said masonry surface;
    removing said wicked slurry from said transfer medium by applying a vacuum to an interior surface of said tubular transfer medium; and
    using said vacuum to draw said wicked slurry through said tubular transfer medium from said exterior surface of said tubular transfer medium towards said interior surface of said tubular transfer medium without disturbing said freshly laid compacted masonry surface.

2. The method of claim 1, wherein said vacuum removes said slurry from said transfer medium without applying a significant vacuum at an exterior surface of said transfer medium in contact with said masonry surface.

3. The method of claim 1, wherein said removing step comprises the step of dispersing said vacuum in said transfer medium to produce vacuum dispersion areas in said transfer medium to uniformly dry said transfer medium.

4. The method of claim 3, wherein said dispersing step comprises the step of overlapping said vacuum dispersion areas.

5. The method of claim 1, wherein said vacuum removes said slurry from said transfer medium through suction apertures disposed in a tubular body supporting said transfer medium.

6. The method of claim 5, wherein said removing step comprises the step of producing a vacuum dispersion area about each suction aperture and distributing said vacuum substantially throughout said transfer medium to uniformly dry said transfer medium.

7. A method of applying an exposed aggregate surface coating to a substrate, comprising the steps of:
    mixing a composite of cement and aggregate consisting essentially of pebbles having a substantially uniform size ranging between 0.125 and 0.5 inch, said composite being mixed in a volume ratio of more than one part cement to four parts aggregate;
    controlling a quantity of water in said composite to provide a slump between two and ten inches;
    depositing said composite onto said substrate;
    applying pressure to said deposited composite to form a compacted layer with a surface and to draw said cement to said surface of said layer;
    applying a fine water spray onto said compacted layer to loosen said cement from said surface of said compacted layer, thereby forming a slurry of water and cement covering said compacted layer;
    applying a tubular transfer medium to said slurry of water and cement covering said compacted layer;
    wicking said slurry into said transfer medium without significantly disturbing said compacted layer;
    rolling said transfer medium over said compacted layer without significantly disturbing said compacted layer; and
    removing said wicked slurry from said tubular transfer medium by applying a vacuum to an interior surface of said tubular transfer medium such that wicked slurry in said tubular transfer medium is drawn towards said interior surface of said tubular transfer medium without disturbing said compacted layer.

8. The method of claim 7, wherein said vacuum removes said slurry from said transfer medium through suction apertures, disposed in a tubular body supporting said transfer medium, by producing vacuum dispersion areas about each suction aperture in said transfer medium and by dispersing said vacuum in said transfer medium to uniformly dry said transfer medium.

9. The method of claim 7, wherein said aggregate pebbles consist essentially of rounded, river washed pebbles having a diameter of approximately 0.125 inch.

10. The method of claim 7, wherein said mixing step comprises mixing said composite in a volume ratio of one part cement to one part aggregate.

11. The method of claim 7, additionally comprising the step of adding an add mix to said composite to alter a mix design of said composite.

12. The method of claim 7, wherein said pressure is locally, progressively applied to said deposited composite to compress said composite to a thickness of about 0.25 inch.

13. The method of claim 7, wherein said step of depositing said composite on said substrate comprises the step of pumping said composite through a cement pump.

14. A method of applying an exposed aggregate surface coating to a substrate, comprising the steps of:
    mixing a composite of cement and aggregate consisting essentially of pebbles having a substantially uniform size ranging between 0.125 and 0.50 inches, said composite being mixed in a volume ratio of more than one part cement to four parts aggregate;
    controlling a quantity of water in said composite to provide a slump of two to ten inches;
    depositing said composite onto said substrate;
    applying pressure to said deposited composite to form a compacted layer with a surface and to draw said cement to said surface of said layer;

applying a fine water spray onto said compacted layer to loosen said cement from said surface of said compacted layer, thereby forming a slurry of water and cement covering said compacted layer.

applying a tubular transfer medium to said slurry of water and cement covering said compacted layer;

wicking said slurry into said tubular transfer medium without significantly disturbing said compacted layer;

rolling said tubular transfer medium over said compacted layer without significantly disturbing said compacted layer; and removing said wicked slurry from said tubular transfer medium, said removing step comprising the steps of:
(1) using a vacuum of about 5 pounds per square inch to draw said wicked slurry from said tubular transfer medium into suction apertures arranged in a series of one inch square quincrux arrangements on an exterior surface of a tubular body, which supports an interior surface of said tubular transfer medium, without significantly disturbing said without significantly disturbing said compacted layer; and
(2) applying said vacuum to a sufficient number of said suction apertures to produce an aggregate suction aperture area to exterior surface area ratio of approximately 0.17.

* * * * *

UNITED STATES PATENT AND TRADEMARK OFFICE
CERTIFICATE OF CORRECTION

PATENT NO. : 5,246,650
DATED : September 21, 1993
INVENTOR(S) : Richard C. Clark It is certified that error appears in the above-indentified patent and that said Letters Patent is hereby corrected as shown below:

Column 1, line 5, change "compacted layer." to --compacted layer;--.

Column 12, line 10 and 11, change "without significantly disturbing said without significantly distrubing said compacted" to --without significantly disturbing said compacted--.

Signed and Sealed this

Twelfth Day of July, 1994

Attest:

BRUCE LEHMAN

Attesting Officer

Commissioner of Patents and Trademarks